United States Patent
Wu et al.

(10) Patent No.: US 9,505,442 B2
(45) Date of Patent: Nov. 29, 2016

(54) ENERGY ABSORBING ROCKER ASSEMBLY

(71) Applicant: FORD GLOBAL TECHNOLOGIES, LLC, Dearborn, MI (US)

(72) Inventors: Chi-Chin Wu, West Bloomfield, MI (US); Abdelmonaam Sassi, Winsor (CA); Lawrence Bis, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/639,185

(22) Filed: Mar. 5, 2015

(65) Prior Publication Data

US 2016/0257346 A1 Sep. 8, 2016

(51) Int. Cl.
*B62D 21/15* (2006.01)
*B60K 1/04* (2006.01)

(52) U.S. Cl.
CPC .............. *B62D 21/157* (2013.01); *B60K 1/04* (2013.01); *B60K 2001/0438* (2013.01)

(58) Field of Classification Search
CPC ................. B62D 21/157; B60K 1/04; B60K 2001/0438
USPC ................. 296/187.12, 193.05, 203.03, 209
See application file for complete search history.

(56) References Cited

U.S. PATENT DOCUMENTS

| | | | |
|---|---|---|---|
| 6,227,322 B1 | 5/2001 | Nishikawa | |
| 6,676,200 B1 | 1/2004 | Peng | |
| 8,007,032 B1 | 8/2011 | Craig | |
| 8,210,301 B2 | 7/2012 | Hashimoto et al. | |
| 8,424,960 B2 * | 4/2013 | Rawlinson | B62D 21/152 296/187.09 |
| 8,464,817 B2 | 6/2013 | Usami et al. | |
| 8,696,051 B2 | 4/2014 | Charbonneau | |
| 8,757,709 B2 | 6/2014 | Rawlinson | |
| 8,833,499 B2 | 9/2014 | Rawlinson | |
| 8,833,839 B2 * | 9/2014 | Young | 296/187.08 |
| 2008/0106119 A1 * | 5/2008 | Ma | B62D 21/157 296/187.12 |
| 2009/0021052 A1 | 1/2009 | Kato | |
| 2012/0153682 A1 | 6/2012 | Rawlinson et al. | |
| 2012/0161472 A1 * | 6/2012 | Rawlinson | B60K 1/04 296/187.08 |
| 2012/0251862 A1 * | 10/2012 | Kano | B60K 1/04 429/99 |
| 2013/0229030 A1 | 9/2013 | Yamaguchi et al. | |
| 2015/0174996 A1 * | 6/2015 | Ikeda | B60K 1/04 180/68.5 |

FOREIGN PATENT DOCUMENTS

| | | | | |
|---|---|---|---|---|
| JP | H07117490 | | 5/1995 | |
| JP | 2891072 B2 * | | 5/1999 | B60K 1/04 |

OTHER PUBLICATIONS

Machine Translation of JP-2891072-B1, printed from the JPO website Jul. 12, 2016.*

* cited by examiner

*Primary Examiner* — Jason S Morrow

(74) *Attorney, Agent, or Firm* — Carlson, Gaskey & Olds, P.C.

(57) ABSTRACT

An exemplary rocker assembly includes a vehicle rocker at a lateral side of a vehicle, and a battery rocker at a lateral side of a battery pack of the vehicle. An exemplary energy absorbing method includes directing a first portion of a side load through a first load path that extends through a vehicle rocker at a lateral side of a vehicle, and directing a second portion of the side load through a second load path that extends through a battery rocker at a lateral side of a battery pack.

20 Claims, 4 Drawing Sheets

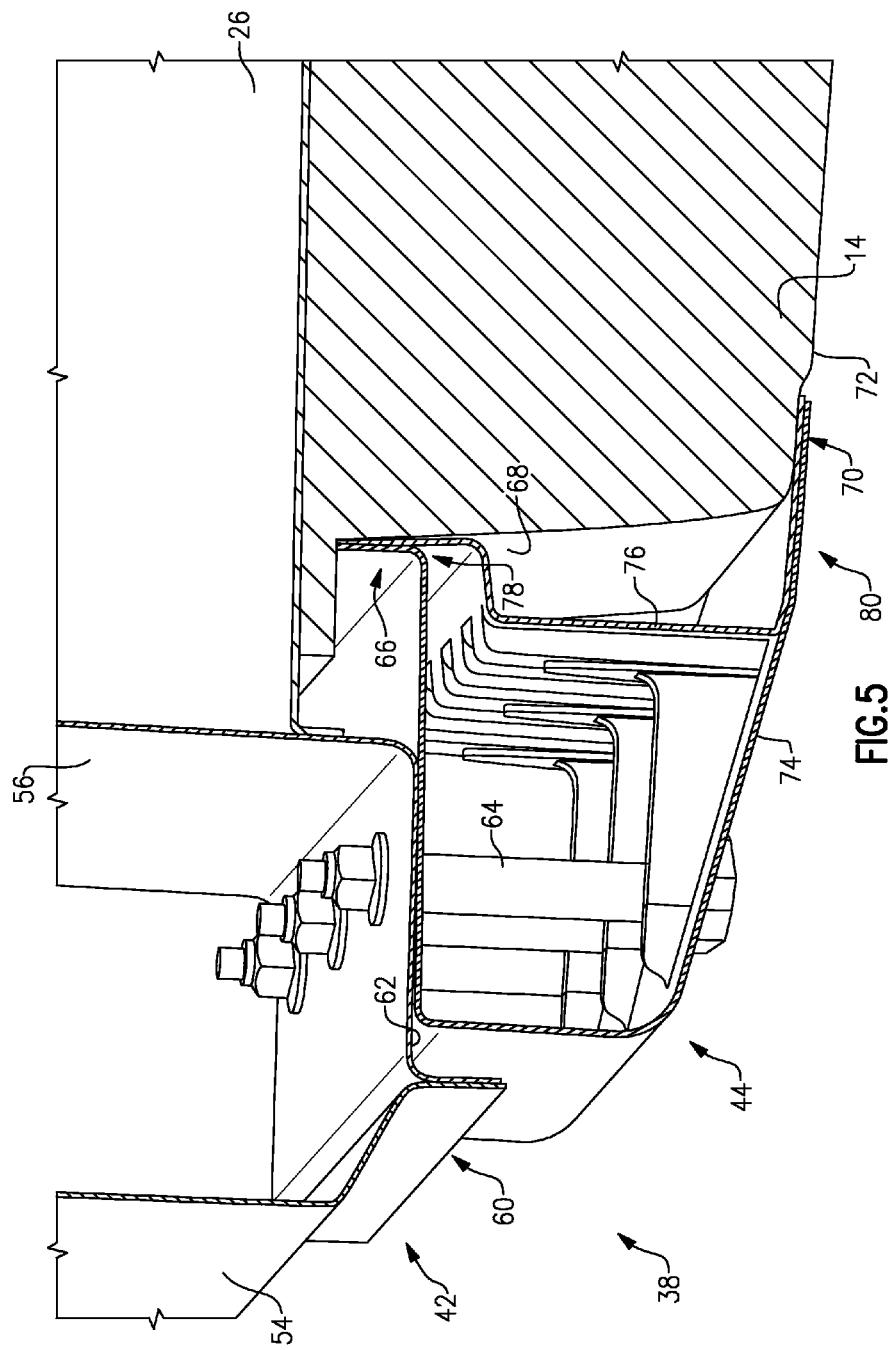

ENERGY ABSORBING ROCKER ASSEMBLY

TECHNICAL FIELD

This disclosure is directed toward a battery pack of an electrified vehicle and, more particularly, to absorbing energy applied to the electrified vehicle during a side impact and to attaching the battery pack.

BACKGROUND

Electrified vehicles use electric motors for propulsion. Electric vehicles, hybrid electric vehicles (HEVs), and plug-in hybrid electric vehicles (PHEVs) are example types of electrified vehicles. Battery packs power the electric motors. Some battery packs are housed near a floor of the electrified vehicle.

SUMMARY

A rocker assembly according to an exemplary aspect of the present disclosure includes, among other things, a vehicle rocker at a lateral side of a vehicle, and a battery rocker at a lateral side of a battery pack of the vehicle.

In a further non-limiting embodiment of the foregoing assembly, the vehicle rocker extends longitudinally a first distance, and the battery rocker extends longitudinally a second distance less than the first distance.

In a further non-limiting embodiment of any of the foregoing assemblies, the vehicle rocker extends longitudinally from a forward position adjacent a front wheel well to a rearward position adjacent a rear wheel well. The battery rocker extends longitudinally a longitudinal length of the battery pack.

In a further non-limiting embodiment of any of the foregoing assemblies, the battery rocker is secured directly to the vehicle rocker.

In a further non-limiting embodiment of any of the foregoing assemblies, the battery rocker is secured directly to the battery pack.

In a further non-limiting embodiment of any of the foregoing assemblies, the battery rocker is secured directly to a downwardly facing surface of the vehicle rocker.

In a further non-limiting embodiment of any of the foregoing assemblies, the battery rocker is crushable relative to the battery pack to absorb part of energy of impact.

In a further non-limiting embodiment of any of the foregoing assemblies, the vehicle rocker extends laterally further from a center of the vehicle than the battery rocker.

In a further non-limiting embodiment of any of the foregoing assemblies, the battery rocker is vertically below the vehicle rocker.

In a further non-limiting embodiment of any of the foregoing assemblies, the battery rocker is secured directly to at a lateral side of the battery pack and a downwardly facing surface of the battery pack.

In a further non-limiting embodiment of any of the foregoing assemblies, the vehicle rocker, the battery rocker, or both are extruded.

In a further non-limiting embodiment of any of the foregoing assemblies, the vehicle rocker, the battery rocker, or both are stamped.

An energy absorbing method according to an exemplary aspect of the present disclosure includes, among other things, directing a first portion of a side load through a first load path that extends through a vehicle rocker at a lateral side of a vehicle, and directing a second portion of the side load through a second load path that extends through a battery rocker at a lateral side of a battery pack.

In a further non-limiting embodiment of the foregoing method, the method includes collapsing the battery rocker independently from the vehicle rocker when applying the side load.

In a further non-limiting embodiment of any of the foregoing methods, the method includes securing the vehicle rocker to the lateral side of the battery pack and a downwardly facing surface of the battery pack.

In a further non-limiting embodiment of any of the foregoing methods, the method includes securing the battery rocker to a downwardly facing surface of the vehicle rocker.

In a further non-limiting embodiment of any of the foregoing methods, the vehicle rocker extends longitudinally a first distance and the battery rocker extends longitudinally a second distance less than the first distance.

In a further non-limiting embodiment of any of the foregoing methods, the vehicle rocker extends longitudinally from a forward position adjacent a front wheel well to a rearward position adjacent a rear wheel well, and the battery rocker extends longitudinally a longitudinal length of the battery pack.

The embodiments, examples and alternatives of the preceding paragraphs, the claims, or the following figures and description, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows:

FIG. 5 shows a perspective view of the section of FIG. 4.

DETAILED DESCRIPTION

This disclosure relates generally to absorbing loads applied to an electrified vehicle. More particularly, the disclosure relates to absorbing side loads applied to the electrified vehicle.

Figure 1:
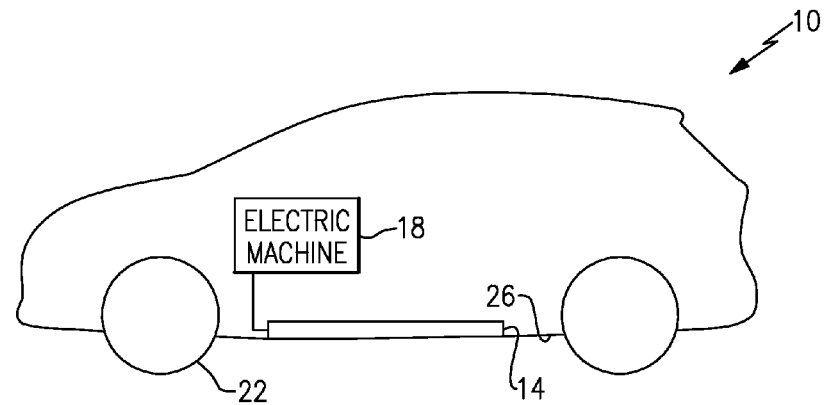
FIG. 1 shows a schematic view of an example electrified vehicle.
Figure 2:
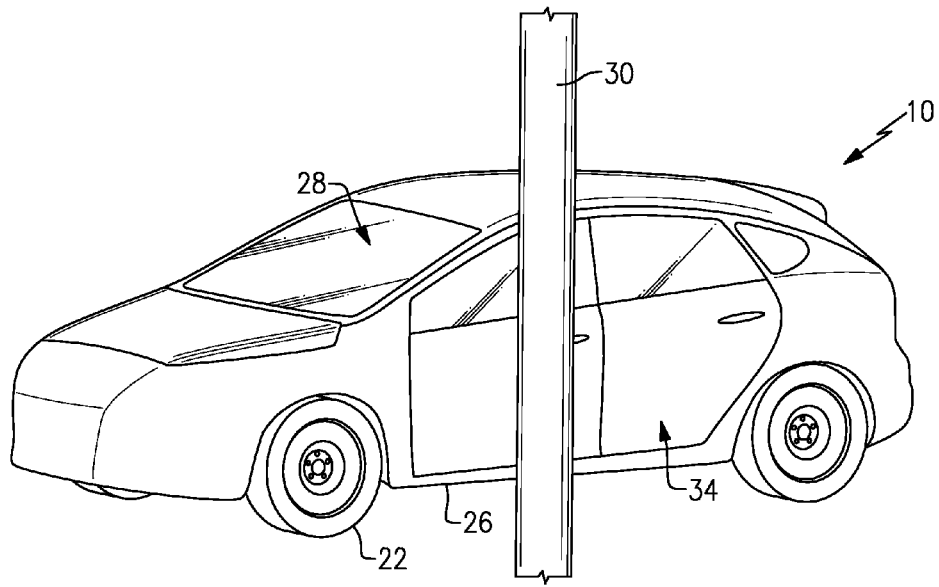
FIG. 2 shows a perspective view of the electrified vehicle of FIG. 1 and a pole.
Figure 3:
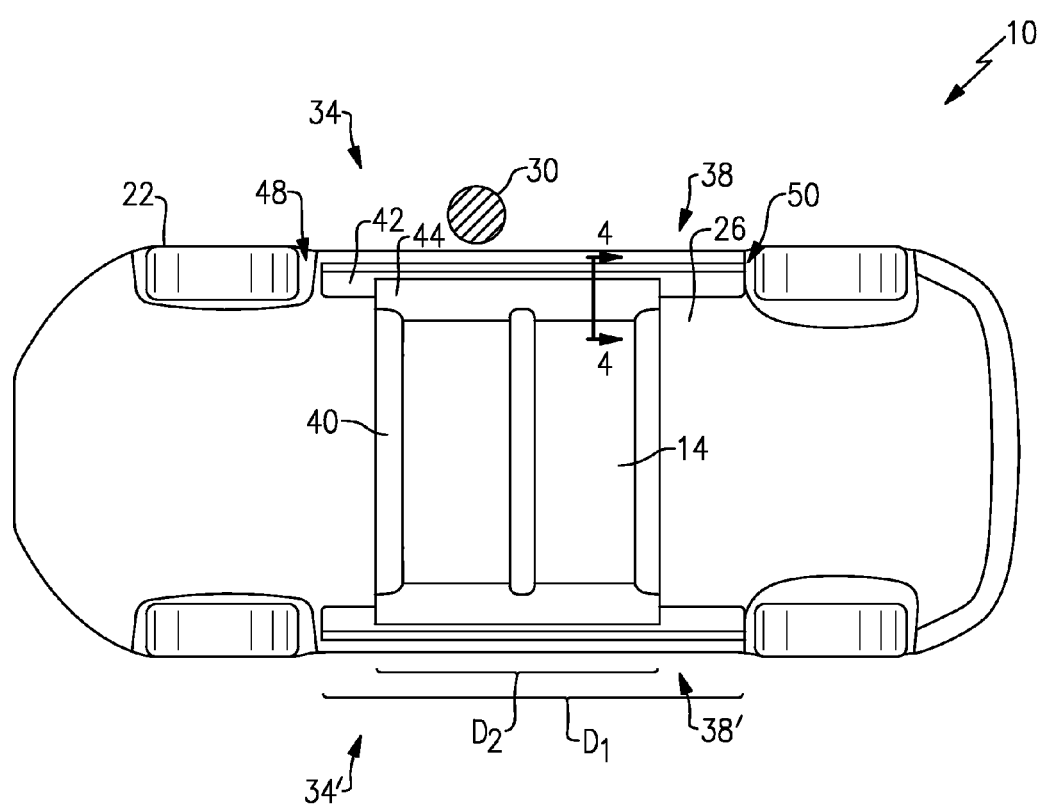
FIG. 3 shows a bottom view of the electrified vehicle of FIG. 2 and the pole.

Referring to FIGS. 1 to 3, an example electrified vehicle 10 includes a battery pack 14 to power an electric motor 18. The vehicle 10 includes wheels 22 driven by the electric motor 18. The electric motor 18 receives electric power from the battery pack 14 and converts the electric power to torque to drive the wheels 22.

The example vehicle 10 is an all-electric vehicle. In other examples, the vehicle 10 is a hybrid electric vehicle, which selectively drives the wheels 22 using an internal combustion engine instead of, or in addition to, the electric motor 18. In hybrid electric examples, the electric motor 18 may selectively operate as a generator to recharge the battery pack 14.

The example battery pack 14 is mounted beneath or adjacent to a floor 26 of the vehicle 10 and below a passenger compartment 28 of the vehicle 10. The example battery pack 14 includes an outer battery cage housing a plurality of battery cells. The example vehicle 10 includes features to absorb applied loads to inhibit the loads from disrupting the battery pack 14 and other components of the vehicle 10.

A type of load applied to the vehicle 10 may be a side impact load. One example of a side impact load includes loads applied to the vehicle 10 when a side of the vehicle 10 contacts a pole 30. To simulate this contact, the vehicle 10 can be moved relative to the pole 30 until the pole 30 contacts a laterally facing side 34 of the vehicle 10.

The example vehicle 10 includes a rocker assembly 38 to help the vehicle 10 absorb loads resulting from contact with the pole 30. The rocker assembly 38 is associated with the laterally facing side 34. Another rocker assembly 38' is associated with a laterally facing side 34' opposite the side 34.

In this example, the rocker assembly 38 represents the laterally outermost portions of a vehicle structure 40. The rocker assembly 38 is considered a sill in some examples. The rocker assembly 38 and the rocker assembly 38' are symmetrical about a centerline of the vehicle 10. The example rocker assembly 38 can be used in connection with a body on frame vehicle or a unitized body vehicle.

The example rocker assembly 38 includes a vehicle rocker 42 and a battery rocker 44. The vehicle rocker 42 extends longitudinally a distance $D_1$ from a forward position adjacent a front wheel well 48 to a rearward position adjacent a rear wheel well 50. The battery rocker 44 extends longitudinally a second distance $D_2$ that corresponds generally to a longitudinal length of the battery pack 14. Notably, the second distance $D_2$ is less than the first distance $D_1$.

Figure 4:
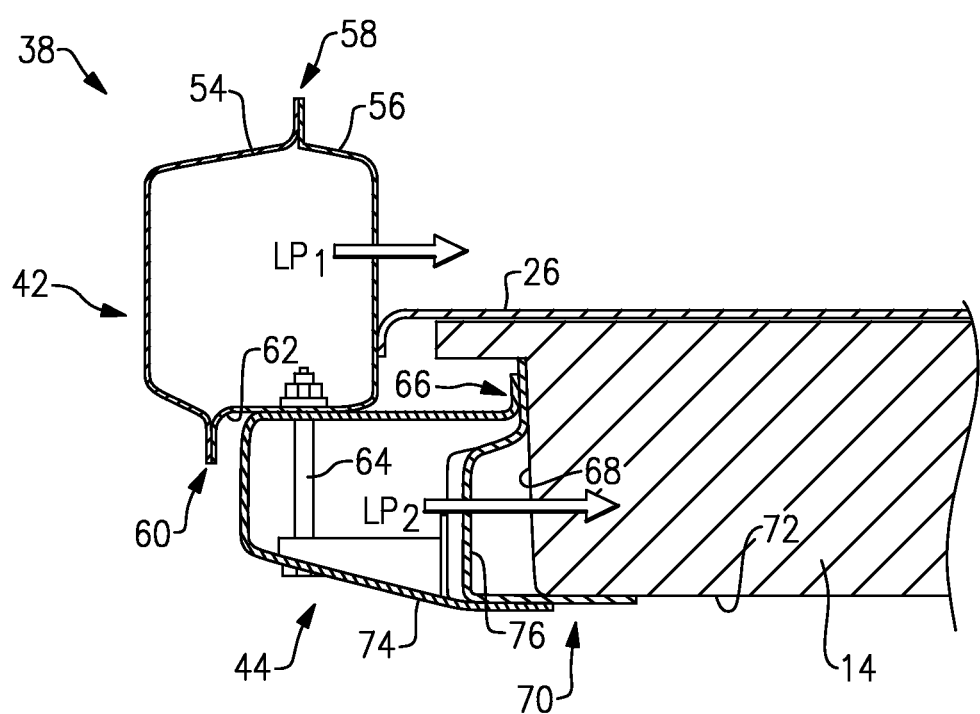
FIG. 4 shows a section view at Line 4-4 in FIG. 3.

Referring now to FIGS. 4 and 5 with continuing reference to FIGS. 2 and 3, the example vehicle rocker 42 includes an outer portion 54 and an inner portion 56. The outer portion 54 and the inner portion 56 each include flanges that attach to each other at interfaces 58 and 60. The attachment between the outer portion 54 and the inner portion 56 may be a welded attachment, for example.

The battery rocker 44 connects to a downwardly facing side 62 of the inner portion 56 of the vehicle rocker 42. The battery rocker 44 is vertically below the vehicle rocker 42 in this example. In other examples, the battery rocker 44 can be partially vertically below the vehicle rocker 42.

Mechanical fasteners 64 may be used to connect the battery rocker 44 to the vehicle rocker 42. During assembly of the vehicle 10, the battery pack 14 is installed to the vehicle structure 40 using at least the mechanical connectors 64.

The battery rocker 44 is connected at a position 66 to a laterally outer side 68 of the battery pack 14. Other attachment schemes could be considered. For example, the battery rocker 44 could be attached to the top of the battery pack 14.

The battery rocker 44 connects at a second position 70 to a downwardly facing side 72 of the battery pack 14. Other attachment schemes could be considered. For example, the battery rocker 44 could be attached to the outer side 68. The battery pack 14 with the battery rocker 44 may be assembled to the vehicle 10 together as a single unit.

The battery rocker 44 includes an outer portion 74 and an inner portion 76. The outer portion 74 and the inner portion 76 connect to each other at interfaces 78 and 80, which are near the positions 66 and 70, respectively. The cross section of the example battery rocker 44 is trapezoidal but not limited to this shape. Variations and modifications to the cross section examples may become apparent to those skilled in the art.

The example vehicle rocker 42 extends laterally further from a center of the vehicle 10 than the battery rocker 44. In other examples, the interface 60 is repositioned such that the battery rocker 44 can extend laterally from a center of the vehicle 10 as far as the vehicle rocker 42.

When the vehicle 10 is moved to contact the pole 30, a side load is applied to the vehicle 10. A portion of this side load is directed through a first load path $LP_1$ extending through the vehicle rocker 42. As the side load increases, and the pole 30 moves closer toward the center of the vehicle 10, a second portion of the side load is directed through a second load path $LP_2$ extending through the battery rocker 44.

In addition to providing portions of the second load path $LP_2$, the battery rocker 44 can act as the stiffener that prevents the vehicle rocker 42 from collapsing when a concentrated load, such as a side load from a pole, is applied. Mechanical fasteners or connectors that tie the vehicle rocker 42 and battery rocker 44 together act as the shear keys that bind the vehicle rocker 42 and battery rocker 44 together as a dual strength component.

Conventional designs, which lack the battery rocker 44, often need to be reinforced with a nylon insert or an extruded multi-cell aluminum section to inhibit collapsing when a concentrated load, such as the side load from the pole, is applied.

Separate load paths can better manage the inertial energy from the battery pack 14 during an impact. The battery rocker 44 is attached to the face of battery pack 14. The battery rocker 44 dissipates the energy, which will reduce the impact energy transmitted to the battery pack 14.

In this example, the battery pack 14 is held by the battery rocker 44. The battery rocker 44 provides impact protection for the battery pack 14 to provide the second load path $LP_2$ separate from the first load path $LP_1$. The two load paths are substantially fully independent, but may overlap in some ways due to fasteners, for example.

Due, in part, to the separate load paths $LP_1$ and $LP_2$, and the vehicle rocker having a cross-section separate from a cross-section of the battery rocker 44, the vehicle rocker 42 and the battery rocker 44 collapse due to the side load independently from each other. Relatively small loads are transferred through fasteners during the collapse. The vehicle rocker 42 and the battery rocker 44 absorb energy as they collapse. In this example, the vehicle rocker 42 and the battery rocker 44 are considered to collapse independently from each other. In another example, the vehicle rocker 42 and the battery rocker 44 collapse partially independently from each other.

The dual load path allows the vehicle rocker 42 to be designed to accommodate a concentrated side load in conventional vehicles that lack the battery pack 14 and the battery rocker 44. The same vehicle rocker 42 can then be used for an electrified vehicle with the battery pack 14 and the battery rocker 44.

The example battery rocker 44 provides a direct and independent load path between the battery pack 14 and the pole 30 that can be designed substantially for the additional load due to the heavy battery inertia. The independent load path between the battery pack 14 and the pole 30 can inhibit the pole 30 from applying force directly to the battery pack 14 without requiring inserts within the vehicle rocker 54, such as structural foam inserts, nylon inserts, welded sections, etc.

The example vehicle rocker 42 and battery rocker 44 do not include such inserts in this example. However, depending on requirements, the vehicle rocker 42, the battery rocker 44, or both, could include such inserts.

The vehicle rocker 42 and the battery rocker 44 could be either or both be extruded from aluminum, or stamped from steel or aluminum, for example.

Notably, the vehicle rocker 42 can be used in conventional vehicles without the battery rocker 44. That is, a separate specialized vehicle rocker is not required for each of a conventional and electrified version of the same vehicle model. Utilizing a common vehicle rocker between a conventional vehicle and an electrified vehicle can reduce assembly complexity.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A vehicle assembly, comprising:
a battery pack having a laterally facing wall with a flange extending laterally from the laterally facing wall;
a vehicle rocker at a lateral side of a vehicle; and
a battery rocker separate and distinct from the battery pack and secured directly to the vehicle rocker, the battery rocker at least partially secured to the laterally facing wall such that the flange laterally overlaps a portion of the battery rocker.

2. The vehicle assembly of claim 1, wherein the vehicle rocker extends longitudinally a first distance and the battery rocker extends longitudinally a second distance less than the first distance.

3. The vehicle assembly of claim 1, wherein the vehicle rocker extends longitudinally from a forward position adjacent a front wheel well to a rearward position adjacent a rear wheel well, and the battery rocker extends longitudinally a longitudinal length of the battery pack.

4. The vehicle assembly of claim 1, wherein the battery rocker and the vehicle rocker each provide a circumferentially continuous cross-section that is separate and distinct from the battery pack.

5. The vehicle assembly of claim 4, wherein the battery rocker is secured directly to the battery pack and to a downwardly facing surface of the vehicle rocker such that the circumferentially continuous cross-section of the battery rocker is laterally spaced from the laterally outer wall of the battery pack to provide an open area between the laterally outer wall and a laterally inner wall of the battery rocker.

6. The vehicle assembly of claim 1, wherein the battery rocker is crushable relative to the battery pack to absorb part of energy of impact.

7. The vehicle assembly of claim 1, wherein the vehicle rocker extends laterally further from a center of the vehicle than the battery rocker.

8. The vehicle assembly of claim 1, wherein the battery rocker is vertically below the vehicle rocker.

9. The vehicle assembly of claim 1, wherein the battery rocker is secured directly to the battery pack at a first location and a second location spaced from the first location, the first location at the laterally facing wall of the battery pack, and the second location at a downwardly facing surface of the battery pack, the battery rocker contacting the laterally facing wall exclusively at the first location and laterally spaced from the laterally facing wall in areas other than the first location.

10. The vehicle assembly of claim 1, wherein the vehicle rocker and the battery rocker are the same material and are both extruded.

11. The vehicle assembly of claim 1, wherein the vehicle rocker and the battery rocker are the same material and are both stamped.

12. An energy absorbing method, comprising:
directing a first portion of a side load through a first load path that extends through a vehicle rocker at a lateral side of a vehicle; and
directing a second portion of the side load through a second load path that extends through a battery rocker at a lateral side of a battery pack, the second portion of the side load collapsing the battery rocker independently from the battery pack, the battery rocker secured directly to the vehicle rocker
wherein the battery pack has a laterally facing wall and a flange extending laterally from the laterally facing wall, and the battery rocker is at least partially secured to the laterally facing wall such that the flange laterally overlaps a portion of the battery rocker.

13. The energy absorbing method of claim 12, further comprising collapsing the battery rocker independently from the vehicle rocker and all portions of the battery pack when applying the side load.

14. The energy absorbing method of claim 12, further comprising securing the battery rocker to the laterally facing wall of the battery pack and a downwardly facing surface of the battery pack, the battery rocker providing a circumferentially continuous cross-section laterally outside the battery pack.

15. The energy absorbing method of claim 14, further comprising securing the battery rocker to the downwardly facing surface of the vehicle rocker.

16. The energy absorbing method of claim 12, wherein the vehicle rocker extends longitudinally a first distance and the battery rocker extends longitudinally a second distance less than the first distance.

17. The vehicle assembly of claim 1, wherein the battery pack houses a plurality of battery cells, wherein the battery rocker comprises an outer portion and an inner portion connected to each other at interfaces to provide a circumferentially continuous cross section outside the laterally facing wall of the battery pack.

18. The energy absorbing method of claim 12, wherein the battery rocker comprises an outer portion and an inner portion connected to each other at interfaces to provide a circumferentially continuous cross-section outside the laterally facing wall of the battery pack.

19. The energy absorbing method of claim 18, wherein the inner portion is secured directly to the battery pack at a first location and a second location spaced from the first location, the first location at the laterally facing wall of the battery pack, and the second location at a downwardly facing surface of the battery pack, the battery rocker contacting the battery pack exclusively at the first location and the second location, the inner portion laterally spaced from the laterally facing wall in areas other than the first location.

20. A vehicle assembly, comprising:
a vehicle rocker;
a battery pack having a flange extending laterally from a wall; and
a battery rocker having a circumferentially continuous cross-section separate and distinct from the battery pack, the battery rocker secured directly to the vehicle rocker, and at least partially secured to the wall such that the flange laterally overlaps a portion of the battery rocker.

* * * * *